(12) United States Patent
Ahn et al.

(10) Patent No.: US 11,357,089 B2
(45) Date of Patent: Jun. 7, 2022

(54) SEQUENTIAL LIGHTING SYSTEM AND CONTROL METHOD THEREOF

(71) Applicants: HYUNDAI MOTOR COMPANY, Seoul (KR); KIA MOTORS CORPORATION, Seoul (KR)

(72) Inventors: Byoung Suk Ahn, Gwacheon-si (KR); Seung Sik Han, Hwaseong-si (KR); Sung Ho Park, Seoul (KR); Ki Hong Lee, Seoul (KR); Jung Wook Lim, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/078,230

(22) Filed: Oct. 23, 2020

(65) Prior Publication Data
US 2021/0392731 A1 Dec. 16, 2021

(30) Foreign Application Priority Data
Jun. 11, 2020 (KR) .......................... 10-2020-0070879

(51) Int. Cl.
*H05B 47/105* (2020.01)
*B60Q 1/14* (2006.01)

(52) U.S. Cl.
CPC ......... *H05B 47/105* (2020.01); *B60Q 1/1407* (2013.01)

(58) Field of Classification Search
CPC .... H05B 47/10; H05B 47/105; H05B 47/155; H05B 45/10; H05B 47/16; H05B 47/167; B60Q 1/38; B60Q 1/34; B60Q 3/80; B60Q 1/1407; B60Q 3/66; G09G 3/3413; G09G 2310/0235; G09G 2320/064; F21S 43/249; F21S 43/2635; F21S 41/24; F21S 43/251

See application file for complete search history.

(56) References Cited

U.S. PATENT DOCUMENTS

| 8,093,832 | B2* | 1/2012 | Jang | H05B 41/3921 |
| | | | | 315/294 |
| 8,624,822 | B2* | 1/2014 | Uehara | G09G 3/3413 |
| | | | | 345/102 |
| 8,823,265 | B2* | 9/2014 | Rice | B60Q 1/38 |
| | | | | 315/77 |
| 9,223,080 | B2* | 12/2015 | Holman | G02B 6/0046 |
| 10,029,612 | B1* | 7/2018 | Yu | B60Q 11/007 |
| 10,053,005 | B2* | 8/2018 | Satake | F21S 43/249 |
| 10,728,980 | B2* | 7/2020 | Takagimoto | B60Q 1/38 |
| 10,814,777 | B2* | 10/2020 | Na | B60Q 1/38 |

(Continued)

FOREIGN PATENT DOCUMENTS

| DE | 10 2011 119 230 A1 | 5/2013 |
| KR | 10-1998-015487 A | 5/1998 |

(Continued)

*Primary Examiner* — Haissa Philogene
(74) *Attorney, Agent, or Firm* — Morgan, Lewis & Bockius LLP

(57) ABSTRACT

Disclosed are a sequential lighting system and a control method thereof in which an aesthetic appearance is improved by implementing sequential lighting when a lighting unit for applying light to the outside of a vehicle is turned on, constituent parts implementing the sequential lighting are simplified, and costs are reduced.

8 Claims, 4 Drawing Sheets

(56) References Cited

U.S. PATENT DOCUMENTS

| | | | | |
|---|---|---|---|---|
| 2007/0211013 A1* | 9/2007 | Uehara | ................ | G09G 3/3413 |
| | | | | 345/102 |
| 2009/0237954 A1* | 9/2009 | Goto | .................... | G02B 6/0006 |
| | | | | 362/551 |
| 2021/0270437 A1* | 9/2021 | Ahn | ........................ | F21S 41/24 |

FOREIGN PATENT DOCUMENTS

| KR | 10-2013-0090542 A | 8/2013 |
|---|---|---|
| KR | 10-2016-0010964 A | 1/2016 |
| KR | 10-2017-0080783 A | 7/2017 |

\* cited by examiner

BRIGHTNESS UP ⟵⟶ BRIGHTNESS DOWN

BRIGHTNESS DOWN ⟵⟶ BRIGHTNESS UP

FIG. 4

| LIGHT STRING SECTION | 1 | 2 | 3 | 4 | 5 | 6 | 7 | 8 | 9 | 10 | Time(s) |
|---|---|---|---|---|---|---|---|---|---|---|---|
| FIRST LIGHT SOURCE | 0 | 0 | 0 | 0 | 0 | 0 | 0 | 0 | 0 | 0 | 0 |
| | 1 | 0 | 0 | 0 | 0 | 0 | 0 | 0 | 0 | 0 | 0.1 |
| | 2 | 1 | 0 | 0 | 0 | 0 | 0 | 0 | 0 | 0 | 0.2 |
| | 3 | 2 | 1 | 0 | 0 | 0 | 0 | 0 | 0 | 0 | 0.3 |
| | 4 | 3 | 2 | 1 | 0 | 0 | 0 | 0 | 0 | 0 | 0.4 |
| | 5 | 4 | 3 | 2 | 1 | 0 | 0 | 0 | 0 | 0 | 0.5 |
| | 6 | 5 | 4 | 3 | 2 | 1 | 0 | 0 | 0 | 0 | 0.6 |
| | 7 | 6 | 5 | 4 | 3 | 2 | 1 | 0 | 0 | 0 | 0.7 |
| | 8 | 7 | 6 | 5 | 4 | 3 | 2 | 1 | 0 | 0 | 0.8 |
| | 9 | 8 | 7 | 6 | 5 | 4 | 3 | 2 | 1 | 0 | 0.9 |
| | 10 | 9 | 8 | 7 | 6 | 5 | 4 | 3 | 2 | 1 | 1 |
| | 8 | 7 | 6 | 5 | 4 | 3 | 2 | 1 | 0 | 0 | 1.1 |
| | 6 | 5 | 4 | 3 | 2 | 1 | 0 | 0 | 0 | 0 | 1.2 |
| | 4 | 3 | 2 | 1 | 0 | 0 | 0 | 0 | 0 | 0 | 1.3 |
| | 2 | 1 | 0 | 0 | 0 | 0 | 0 | 0 | 0 | 0 | 1.4 |
| | 0 | 0 | 0 | 0 | 0 | 0 | 0 | 0 | 0 | 0 | 1.5 |
| | 0 | 0 | 0 | 0 | 0 | 0 | 0 | 0 | 0 | 0 | 1.6 |
| | 0 | 0 | 0 | 0 | 0 | 0 | 0 | 0 | 0 | 0 | 1.7 |
| | 0 | 0 | 0 | 0 | 0 | 0 | 0 | 0 | 0 | 0 | 1.8 |
| | 0 | 0 | 0 | 0 | 0 | 0 | 0 | 0 | 0 | 0 | 1.9 |
| | 0 | 0 | 0 | 0 | 0 | 0 | 0 | 0 | 0 | 0 | 2 |
| | 0 | 0 | 0 | 0 | 0 | 0 | 0 | 0 | 0 | 0 | 2.1 |
| | 0 | 0 | 0 | 0 | 0 | 0 | 0 | 0 | 0 | 0 | 2.2 |
| | 0 | 0 | 0 | 0 | 0 | 0 | 0 | 0 | 0 | 0 | 2.3 |
| | 0 | 0 | 0 | 0 | 0 | 0 | 0 | 0 | 0 | 0 | 2.4 |
| | 0 | 0 | 0 | 0 | 0 | 0 | 0 | 0 | 0 | 0 | 2.5 |
| | 0 | 0 | 0 | 0 | 0 | 0 | 0 | 0 | 0 | 0 | 2.6 |
| | 0 | 0 | 0 | 0 | 0 | 0 | 0 | 0 | 0 | 0 | 2.7 |
| | 0 | 0 | 0 | 0 | 0 | 0 | 0 | 0 | 0 | 0 | 2.8 |

FIG. 5

| Time(s) | 10 | 9 | 8 | 7 | 6 | 5 | 4 | 3 | 2 | 1 | LIGHT STRING SECTION |
|---|---|---|---|---|---|---|---|---|---|---|---|
| 0 | 0 | 0 | 0 | 0 | 0 | 0 | 0 | 0 | 0 | 0 | |
| 0.1 | 0 | 0 | 0 | 0 | 0 | 0 | 0 | 0 | 0 | 0 | |
| 0.2 | 0 | 0 | 0 | 0 | 0 | 0 | 0 | 0 | 0 | 0 | |
| 0.3 | 0 | 0 | 0 | 0 | 0 | 0 | 0 | 0 | 0 | 0 | |
| 0.4 | 0 | 0 | 0 | 0 | 0 | 0 | 0 | 0 | 0 | 0.5 | |
| 0.5 | 0 | 0 | 0 | 0 | 0 | 0 | 0 | 0 | 0.5 | 1 | |
| 0.6 | 0 | 0 | 0 | 0 | 0 | 0 | 0 | 0.5 | 1 | 1.5 | |
| 0.7 | 0 | 0 | 0 | 0 | 0 | 0 | 0.5 | 1 | 1.5 | 2 | |
| 0.8 | 0 | 0 | 0 | 0 | 0 | 0.5 | 1 | 1.5 | 2 | 2.5 | |
| 0.9 | 0 | 0 | 0 | 0 | 0.5 | 1 | 1.5 | 2 | 2.5 | 3 | |
| 1 | 0 | 0 | 0 | 0.5 | 1 | 1.5 | 2 | 2.5 | 3 | 3.5 | |
| 1.1 | 0 | 0 | 0.5 | 1 | 1.5 | 2 | 2.5 | 3 | 3.5 | 4 | |
| 1.2 | 0 | 0.5 | 1 | 1.5 | 2 | 2.5 | 3 | 3.5 | 4 | 4.5 | |
| 1.3 | 0.5 | 1 | 1.5 | 2 | 2.5 | 3 | 3.5 | 4 | 4.5 | 5 | |
| 1.4 | 0.17 | 0.67 | 1.17 | 1.67 | 2.17 | 2.67 | 3.17 | 3.67 | 4.17 | 4.67 | SECOND LIGHT SOURCE |
| 1.5 | 0 | 0.34 | 0.84 | 1.34 | 1.84 | 2.34 | 2.84 | 3.34 | 3.84 | 4.34 | |
| 1.6 | 0 | 0 | 0.5 | 1 | 1.5 | 2 | 2.5 | 3 | 3.5 | 4 | |
| 1.7 | 0 | 0 | 0.17 | 0.67 | 1.17 | 1.67 | 2.17 | 2.67 | 3.17 | 3.67 | |
| 1.8 | 0 | 0 | 0 | 0.34 | 0.84 | 1.34 | 1.84 | 2.34 | 2.84 | 3.34 | |
| 1.9 | 0 | 0 | 0 | 0 | 0.5 | 1 | 1.5 | 2 | 2.5 | 3 | |
| 2 | 0 | 0 | 0 | 0 | 0.17 | 0.67 | 1.17 | 1.67 | 2.17 | 2.67 | |
| 2.1 | 0 | 0 | 0 | 0 | 0 | 0.34 | 0.84 | 1.34 | 1.84 | 2.34 | |
| 2.2 | 0 | 0 | 0 | 0 | 0 | 0 | 0.5 | 1 | 1.5 | 2 | |
| 2.3 | 0 | 0 | 0 | 0 | 0 | 0 | 0.17 | 0.67 | 1.17 | 1.67 | |
| 2.4 | 0 | 0 | 0 | 0 | 0 | 0 | 0 | 0.34 | 0.84 | 1.34 | |
| 2.5 | 0 | 0 | 0 | 0 | 0 | 0 | 0 | 0 | 0.5 | 1 | |
| 2.6 | 0 | 0 | 0 | 0 | 0 | 0 | 0 | 0 | 0.17 | 0.67 | |
| 2.7 | 0 | 0 | 0 | 0 | 0 | 0 | 0 | 0 | 0 | 0.34 | |
| 2.8 | 0 | 0 | 0 | 0 | 0 | 0 | 0 | 0 | 0 | 0 | |

SEQUENTIAL LIGHTING SYSTEM AND CONTROL METHOD THEREOF

CROSS REFERENCE TO RELATED APPLICATION

The present application claims priority to Korean Patent Application No. 10-2020-0070879, filed Jun. 11, 2020, the entire contents of which is incorporated herein for all purposes by this reference.

TECHNICAL FIELD

The present disclosure relates to a sequential lighting system and a control method thereof which allow a lighting unit of a vehicle to be sequentially turned on.

BACKGROUND

Lighting units utilizing various light sources are applied to a vehicle. Each of the lighting units is suitably used to be suitable for characteristics thereof according to an installation position and a use.

These lighting units include an indoor lamp installed inside the vehicle, and a headlight, a fog lamp, a backup lamp, a parking lamp, a license plate lamp, a rear combination lamp, a stop lamp, a turn signal lamp, and a hazard warning signal lamp which are installed outside the vehicle.

Especially, because the lighting units installed outside the vehicle contribute to making a high-class product in the design aspect, a lighting design and effect of the vehicle are also regarded as important.

In general, the lighting units installed on the vehicle place emphasize on application of light toward the front, and emphasis is placed on technology development for securing condensing and diffusing rates of light. Also, to improve a design for the lighting units, shapes around the lighting units are changed, so that beauty is improved. To the end, a lighting unit having a sequential lighting mode is typically applied.

As a plurality of light sources are generally applied to the lighting unit having a sequential lighting mode, there is a problem in that the number of parts is increased and a system is complicated.

The information disclosed in this Background section is only for the enhancement of understanding of the background of the present disclosure, and should not be taken as an acknowledgment or as any form of suggestion that this information forms the prior art that would already be known to a person of ordinary skill in the art.

SUMMARY

The present disclosure has been made in order to solve the above-mentioned problems in the prior art and an aspect of the present disclosure is to provide a sequential lighting system and a control method thereof in which an aesthetic appearance is improved by implementing sequential lighting when a lighting unit for applying light to the outside of a vehicle is turned on, and thus a commodity value is improved, and also constituent parts are simplified, and thus costs are reduced.

In accordance with an aspect of the present disclosure, there is provided a sequential lighting system which includes: a light guide configured to allow some light to be reflected and moved therein when light is incident upon an inside thereof and allow some light to be transmitted and emitted to an outside thereof; first and second light sources respectively provided at one end and the other end of the light guide and configured to apply light into the light guide at different positions; and a controller configured to control lighting of each of the first and second light sources and control a lighting time of each of the first and second light sources to allow the light guide to emit the light in a sequential lighting mode.

The first and second light sources may have different maximum brightnesses when turned on.

In the case where the first light source is turned on ahead of the second light source by the controller, brightness of the first light sources may be configured to be brighter than that of the second light source.

The controller may conduct cross control under which the first light source is turned on first and then the second light source is turned on, so that light may be emitted while the light guide is crossed from the one end thereof to the other end thereof.

In the case where the first light source is turned on ahead of the second light source by the controller, a time when the first light source reaches maximum brightness may be longer than a time when the first light source is turned off from the maximum brightness, and a time when the second light source is turned off from the maximum brightness may be longer than a time when the second light source reaches the maximum brightness If the first light source is turned on and a setting time has elapsed, the controller may control the second light source to be turned on, and control the first light source and the second light source to be turned off when reaching maximum brightness.

If the first light source is turned on and a setting time has elapsed, the controller may allow the second light source to be turned on, allow first light source to be maintained in a lighted state even if the first light source reaches maximum brightness, and turn off the first light source and the second light source at the same time when the first light source and the second light source reach the maximum brightness.

In accordance with another aspect of the present disclosure, there is provided a control method of a sequential lighting system in which first and second light sources are respectively provided at one end and the other end of a light guide, the control method including: a first light source control step of turning on the first light source; and a second light source control step of turning on the second light source when a setting time has elapsed after the first light source is turned on, so as to increase brightness of the light guide while the light guide is crossed from the one end thereof to the other end thereof.

The first light source control step may include turning off the first light source when the first light source reaches maximum brightness, and the second light source control step may include turning off the second light source when the second light source reaches the maximum brightness after the first light source, so as to reduce brightness of the light guide while the light guide is crossed from the one end thereof to the other end thereof.

The first light source control step may include maintaining a lighted state of the first light source even if the first light source reaches the maximum brightness and turning off the first light source when the second light source reaches the maximum brightness, and the second light source control step may include turning off the second light source when the second light source reaches the maximum brightness.

According to the sequential lighting system formed in the structure as described above and the control method thereof, an aesthetic appearance is improved by implementing sequential lighting when a lighting unit for applying light to the outside of a vehicle is turned on, a commodity value is improved, constituent parts for implementing the sequential lighting are simplified, and thus costs are reduced.

BRIEF DESCRIPTION OF THE DRAWINGS

The above and other aspects, features and advantages of the present disclosure will be more apparent from the following detailed description taken in conjunction with the accompanying drawings, in which:

FIGS. 4 and 5 are views illustrating an embodiment of the sequential lighting system illustrated in FIG. 1.

DETAILED DESCRIPTION OF THE EXEMPLARY EMBODIMENTS

Hereinafter, a sequential lighting system and a control method thereof according to exemplary embodiments of the present disclosure will be described with reference to the accompanying drawings.

Figure 1:
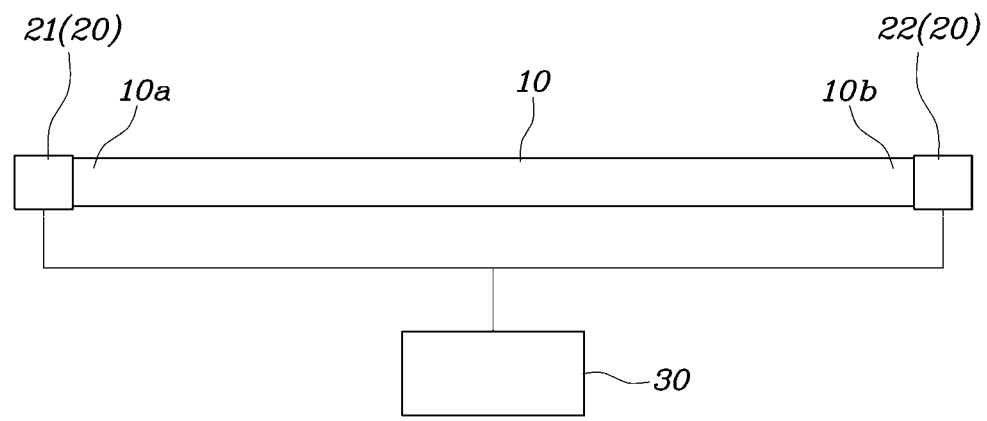
FIG. 1 is a view illustrating a configuration of a sequential lighting system according to the present disclosure.
Figure 2:
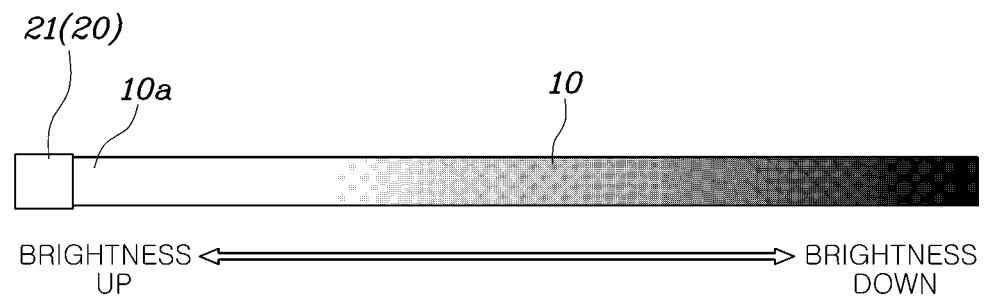
FIGS. 2 and 3 are views illustrating the sequential lighting system illustrated in FIG. 1.
Figure 3:
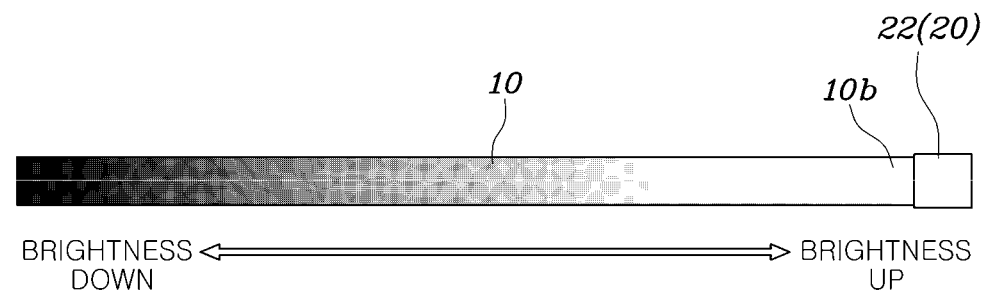
Figure 6:
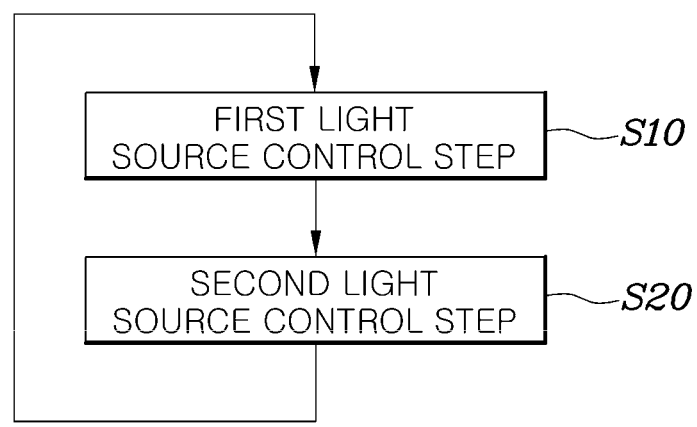
FIG. 6 is a flow chart illustrating a control method of the sequential lighting system of the present disclosure.

FIG. 1 is a view illustrating a configuration of a sequential lighting system according to an embodiment of the present disclosure. FIGS. 2 and 3 are views illustrating the sequential lighting system illustrated in FIG. 1. FIGS. 4 and 5 are views illustrating an embodiment of the sequential lighting system illustrated in FIG. 1. FIG. 6 is a flow chart illustrating a control method of the sequential lighting system of the present disclosure.

As illustrated in FIG. 1, the present disclosure includes a light guide 10 that allows some light to be reflected and moved therein when light is incident upon the inside thereof and allows some light to be transmitted and emitted to the outside thereof, a plurality of light sources 20 that are provided at one end 10*a* and the other end 10*b* of the light guide 10 and apply light into the light guide 10 at different positions, and a controller 30 that allows the light guide 10 to emit light in a sequential lighting mode by controlling lighting of each of the light sources 20 and controlling a lighting time of each of the light sources 20.

Here, the light guide 10 extends in a given direction, and is formed of a semitransparent material having low transmittance, so that, when light enters the inside of the light guide 10, some of the light is reflected and moved in the light guide 10 in an extending direction, and some of the light is emitted to the outside. Thus, an emission amount of the light that enters a portion of the light guide 10 is high, and as the emission amount of the light is gradually reduced in a direction away from the portion which the light enters, a gradation lighting image may be implemented. The light guide 10 may be formed in various shapes such as a straight line or a curved ling according to a shape of a lamp.

The light sources 20 applying light to the light guide 10 are provided at one end 10*a* and the other end 10*b* of the light guide 10. LEDs may be used as the light sources 20, and as light is applied into the light guide 10 at one end 10*a* and the other end 10*b* of the light guide 10, the light is emitted through the light guide 10.

The light sources 20 are controlled and turned on or off by the controller 30. Especially, the controller 30 differently (or independently) controls lighting times of the light sources 20, and thereby the light guide 10 emits light in a sequential lighting mode. That is, as the light guide 10 is formed of a semitransparent material having low transmittance, the gradation lighting image is implemented, and the light guide 10 can emit light in various lighting modes by controlling the lighting time of each of the light sources 20. Typically, if the controller 30 turns on the light source 20 provided at one end 10*a* of the light guide 10 and then turns on the light source 20 provided at the other end 10*b* of the light guide 10, the light guide 10 can implement sequential lighting in such a way that an emission amount of light gradually increases from one end 10*a* to the other end 10*b*.

Further, if the controller 30 turns on the light sources 20 provided at one end 10*a* and the other end 10*b* of the light guide 10 at the same time, sequential lighting can be implemented in such a way that light is emitted from one end 10*a* and the other end 10*b* of the light guide 10 and then an emission amount of the light at a middle portion of the light guide 10 gradually increases.

In this way, the present disclosure provides the light sources 20 at one end 10*a* and the other end 10*b* of the light guide 10, and controls the lighting time of each of the light sources 20 to implement the various lighting modes. Thereby, a high-class lighting image is obtained, and as the number of light sources 20 is minimized, material expenses are reduced.

To specify the present disclosure described above, as can be seen in FIG. 1, the plurality of light sources include a first light source 21 that is provided at one end 10*a* of the light guide 10 and applies light into the light guide 10, and a second light source 22 that is provided at the other end 10*b* of the light guide 10 and applies light into the light guide 10, and the first and second light sources 21 and 22 may have different maximum brightnesses when turned on.

In this way, the light sources 20 include the first light source 21 that is provided at one end 10*a* of the light guide 10 and the second light source 22 that is provided at the other end 10*b* of the light guide 10 on the basis of the light guide 10. That is, as illustrated in FIG. 2, in the case where the first light source 21 is turned on, a gradation lighting image is implemented in such a way that an emission amount of light adjacent to one end 10*a* of the light guide 10 is high, and an emission amount of light is gradually reduced toward the other end 10*b* of the light guide 10. In contrast, as illustrated in FIG. 3, in the case where the second light source 22 is turned on, a gradation lighting image is implemented in such a way that an emission amount of light adjacent to the other end 10*b* of the light guide 10 is high, and an emission amount of light is gradually reduced toward one end 10*a* of the light guide 10.

Here, the first light source 21 and the second light source 22 may have different maximum brightnesses when turned on. In this way, the maximum brightness of the first light source 21 and the maximum brightness of the second light source 22 are configured to be different from each other. Thereby, when the lighting times of the first and second light sources 21 and 22 are differently set to implement the sequential lighting of the light guide 10, a light-emitting type of the sequential lighting mode can be more softly implemented.

In detail, in the case where the first light source 21 is turned on by the controller 30 before the second light source 22 is turned on, the brightness of the first light source 21 can be configured to be brighter than that of the second light source 22.

In the present disclosure, the light guide 10 is formed of a semitransparent material having low transmittance, so that, when light enters the inside of the light guide 10, some of the light is reflected and moved in the light guide 10 in an extending direction, and some of the light is emitted to the outside. Thus, assuming that the first light source 21 provided at one end 10a of the light guide 10 is turned on, the light guide 10 emits light in such a way that the light is bright at one end 10a thereof and is dark toward the other end 10b thereof. If the first light source 21 and the second light source 22 are turned on at the same brightness, the sequential lighting of the light guide 10 is out of balance and is not soft because the other end 10b of the light guide 10 becomes bright at too fast a speed.

Thus, the light source 20 turned on first is configured such that maximum brightness is brighter than that of the light source 20 turned on next, and thus the sequential lighting of the light guide 10 may be softly implemented without a disparate feeling.

In addition, in the case where the first light source 21 is turned on ahead of the second light source 22 by the controller 30, the first light source 21 may be configured such that a time when the first light source 21 reaches the maximum brightness is longer than a time when the first light source 21 is turned off from the maximum brightness, and the second light source 22 may be configured such that a time when the second light source 22 is turned off from the maximum brightness is longer than a time when the second light source 22 reaches the maximum brightness.

In this way, the first light source 21 is configured such that a time when the first light source 21 reaches the maximum brightness is longer than a time when the first light source 21 is turned off from the maximum brightness, and thereby the first light source 21 can be turned on in such a way that one end 10a of the light guide 10 gradually becomes bright softly. Also, as the first light source 21 is turned on and then the second light source 22 is turned on, the light guide 10 gradually becomes bright from one end 10a thereof to the other end 10b thereof, so that soft sequential lighting can be implemented.

Meanwhile, the present disclosure should have a form in which the light sources 20 are sequentially turned off when turned off. Accordingly, the first light source 21 is rapidly turned off by setting a time when the first light source 21 is turned off from the maximum brightness to be shorter than a time when the first light source 21 reaches the maximum brightness, and the second light source 22 is turned off for a long time by setting a time when the second light source 22 is turned off from the maximum brightness to be longer than a time when the second light source 22 reaches the maximum brightness.

That is, if the first light source 21 is turned on, light of the first light source 21 is also transmitted toward the other end 10b of the light guide 10. If the second light source 22 is turned on, light of the second light source 22 is also transmitted toward one end 10a of the light guide 10. Accordingly, the first light source 21 is turned off within a relatively short time, and a state in which one end 10a of the light guide 10 is slightly bright due to the light of the second light source 22 is maintained. Next, as the second light source 22 is turned off for a relatively long time, the light is gradually lost from one end 10a to the other end 10b of the light guide 10.

As a result, a sequential lighting or lighting-out operation of the light guide 10 of the present disclosure can be implemented at the time of lighting as well as lighting-out.

The present disclosure may implement various types of sequential lighting as follows using the light sources and the light guide 10.

Especially, in the present disclosure, the controller 30 conducts cross control under which the first light source 21 is turned on first and then the second light source 22 is turned on, and thereby light is emitted while the light guide 10 is crossed from one end 10a thereof to the other end 10b. Of course, control under which the second light source 22 is turned on first and then the first light source 21 is turned on may be conducted, which is selectively changed according to a light-emitting pattern of the light guide 10. In this way, as the sequential lighting is performed while the light guide 10 is crossed from one end 10a thereof to the other end 10b, a light-emitting image effect of the light guide 10 is improved, and various lighting types can be implemented. That is, a light-emitting image of the light guide 10 can be diversified by controlling lighting and lighting-out times of the first light source 21 and the second light source 22.

As a first embodiment, if the first light source 21 is turned on and then a setting time has elapsed, the controller 30 may control the second light source 22 to be turned on, and control the first light source 21 and the second light source 22 to be turned off when each of the first light source 21 and the second light source 22 reaches the maximum brightness.

For this reason, as the first light source 21 is turned on, the light guide 10 is configured such that one end 10a thereof becomes brightest and the other end 10b thereof gradually becomes bright. The second light source 22 is turned on after the setting time has elapsed, the other end 10b of the light guide 10 is made bright by light applied from the first light source 21 and light applied from the second light source 22. In this way, the sequential lighting of the light guide 10 which gradually becomes bright from one end 10a to the other end 10b is implemented.

Here, the first light source 21 and the second light source 22 are configured to be turned off when reaching the maximum brightness. Thereby, the first light source 21 turned on first is turned off first as the first light source 21 reaches the maximum brightness ahead of the second light source 22, and then the second light source 22 is turned off. Accordingly, one end 10a of the light guide 10 becomes dark when the first light source 21 is turned off, and emits light at low brightness due to the light applied from the second light source 22. However, as the second light source 22 next to the first light source 21 is turned off, the other end 10b of the light guide 10 gradually becomes dark. In this way, the sequential lighting-out of the light guide 10 which gradually becomes dark from the one end 10a to the other end 10b is implemented.

As an example, as illustrated in FIGS. 4 and 5, the first light source 21 and the second light source 22 may be controlled with the lapse of time. Here, the maximum brightness of the second light source 22 may be set, for example, by the controller 30, to a level of 50% of the maximum brightness of the first light source 21, and the times when the first light source 21 and the second light source 22 reach the maximum brightness and are turned off may be previously determined. Thereby, as the first light source 21 is turned on, and after the setting time has elapsed, the second light source 22 is turned on, and as the times when the first light source 21 and the second light source 22 are turned off are different, the sequential lighting of the light guide 10 may be implemented. Control based on brightness of each time zone of the first light source 21 illustrated in FIG. 4 and control based on brightness of each time zone of the second light source 22 illustrated in FIG. 5 are illustrative, and various embodiments based on them may be implemented.

Meanwhile, as a second embodiment, the controller 30 may enable the second light source 22 to be turned on if the first light source 21 is turned on and then the setting time has elapsed, may keep the first light source 21 turned on even if the second light source 22 reaches the maximum brightness, and may turn off the first light source 21 and the second light source 22 at the same time if the second light source 22 reaches the maximum brightness.

For this reason, as the first light source 21 is turned on, one end 10a of the light guide 10 becomes brightest, and the other end 10b of the light guide 10 gradually becomes bright. After the setting time has elapsed, the second light source 22 is turned on, and the other end 10b of the light guide 10 becomes bright due to the light applied from the first light source 21 and the light applied from the second light source 22. In this way, the sequential lighting of the light guide 10 which gradually becomes bright from the one end 10a to the other end 10b is implemented.

Meanwhile, a state in which the first light source 21 is turned on is maintained even if the second light source 22 reaches the maximum brightness, and the first light source 21 and the second light source 22 are simultaneously turned off when the second light source 22 reaches the maximum brightness. Thereby, the light guide 10 lights out as a whole.

That is, the first light source 21 is configured such that brightness thereof is relatively higher than that of the second light source 22 and a time when the first light source 21 is turned off is short, and the second light source 22 is configured such that brightness thereof is relatively lower than that of the first light source 21 and a time when the second light source 22 is turned off is long. Thereby, even if the first light source 21 and the second light source 22 are simultaneously turned off, the light guide 10 may light out as a whole. The light applied from the first light source 21 is transmitted up to the other end 10b of the light guide 10, and the light applied from the second light source 22 is partly transmitted up to one end 10a of the light guide 10. As the intensity of radiation of the first light source 21 becomes higher, even if the first light source 21 and the second light source 22 are simultaneously turned off, an image in which the entire light guide 10 lights out is implemented.

Meanwhile, referring to FIG. 6, a control method of a sequential lighting system according to the present disclosure is a control method of a sequential lighting system in which light sources are provided at one end and the other end of a light guide, and includes a first light source control step S10 of turning on the light source adjacent to one end of the light guide, and a second light source control step S20 of turning on the light source adjacent to the other end of the light guide when a setting time has elapsed after the light source adjacent to one end of the light guide is turned on, and thereby increasing brightness of the light guide while the light guide is crossed from one end thereof to the other end thereof.

For this reason, as the light source adjacent to one end of the light guide is turned on by performing the first light source control step S10, one end of the light guide becomes brightest, and the other end of the light guide gradually becomes bright. The light source adjacent to the other end of the light guide is turned on by performing the second light source control step S20 after the lapse of the setting time, and the other end of the light guide becomes bright by light applied from the light source adjacent to one end of the light guide and light applied from the light source adjacent to the other end of the light guide. In this way, sequential lighting of the light guide which gradually becomes bright from one end to the other end of the light guide is implemented.

Meanwhile, the first light source control step S10 includes turning off the light source adjacent to one end of the light guide when the light source reaches maximum brightness, and the second light source control step S20 includes turning off the light source adjacent to the other end of the light guide when the light source reaches the maximum brightness after the light source adjacent to one end of the light guide is turned off. Thereby, brightness of the light guide is reduced while the light guide is crossed from one end thereof to the other end thereof.

In this way, the light sources adjacent to one end and the other end of the light guide are turned off when reaching the maximum brightness. Thereby, as the light source that is adjacent to one end of the light guide and is turned on first reaches the maximum brightness ahead of the light source adjacent to the other end of the light guide, the light source adjacent to one end of the light guide is turned off, and then the light source adjacent to the other end of the light guide is turned off.

Accordingly, one end of the light guide becomes dark when the light source adjacent to one end of the light guide is turned off, and emits light at low brightness by the light applied from the light source adjacent to the other end of the light guide. However, as the light source adjacent to the other end of the light guide is turned off after the light source adjacent to one end of the light guide is turned off, the light source adjacent to the other end of the light guide gradually becomes dark. In this way, the sequential lighting-out of the light guide which gradually becomes dark from one end to the other end is implemented.

Meanwhile, as another embodiment, the first light source control step S10 includes maintaining a lighted state of the light source adjacent to one end of the light guide even if the light source adjacent to one end of the light guide reaches the maximum brightness and turning off the light source adjacent to one end of the light guide when the light source adjacent to the other end of the light guide reaches the maximum brightness, and the second light source control step S20 includes turning off the light source adjacent to the other end of the light guide when the light source adjacent to the other end of the light guide reaches the maximum brightness.

That is, the state in which the light source adjacent to one end of the light guide is turned on is maintained even if the light source adjacent to the other end of the light guide reaches the maximum brightness, and the light sources adjacent to one end and the other end of the light guide are simultaneously turned off when the light source adjacent to the other end of the light guide reaches the maximum brightness. Thereby, the light guide lights out as a whole.

The controller may include a processor or a microprocessor. In addition, the controller may also include a memory. The aforementioned operations/functions can be embodied as computer readable code/algorithm/software stored on the memory which may include a computer readable recording medium. The computer readable recording medium is any data storage device that can store data which can thereafter be read by the CPU. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc. The processor or a microprocessor may perform the above described operations/functions, by executing the computer readable code/algorithm/software stored on the computer readable recording medium.

In the sequential lighting system formed in the structure as described above, an aesthetic appearance is improved by implementing the sequential lighting when a lighting unit for applying light to the outside of a vehicle is turned on, constituent parts for implementing the sequential lighting are simplified, and costs are reduced. Especially, as the lighting times of the light sources are adjusted, and various lighting patterns are implemented, a commodity value is improved.

Although the specific embodiments of the present disclosure have been described, those skilled in the art will appreciate that various modifications, additions and substitutions are possible, without departing from the scope and spirit of the present disclosure as disclosed in the accompanying claims.

What is claimed is:

1. A sequential lighting system comprising:
a light guide configured to allow some light to be reflected and moved therein when light is incident upon an inside thereof and allow some light to be transmitted and emitted to an outside thereof;
first and second light sources respectively provided at one end and the other end of the light guide and configured to apply light into the light guide at different positions; and
a controller configured to control lighting of each of the first and second light sources and control a lighting time of each of the first and second light sources to allow the light guide to emit the light in a sequential lighting mode,
wherein the first and second light sources have different maximum brightnesses when turned on, and
in the case where the first light source is turned on ahead of the second light source by the controller, a time when the first light source reaches maximum brightness is longer than a time when the first light source is turned off from the maximum brightness, and a time when the second light source is turned off from the maximum brightness is longer than a time when the second light source reaches the maximum brightness.

2. The sequential lighting system according to claim 1, wherein, in the case where the first light source is turned on ahead of the second light source by the controller, brightness of the first light sources is configured to be brighter than that of the second light source.

3. The sequential lighting system according to claim 2, wherein the controller conducts cross control under which the first light source is turned on first and then the second light source is turned on, so that light is emitted while the light guide is crossed from the one end thereof to the other end thereof.

4. The sequential lighting system according to claim 3, wherein, if the first light source is turned on and a setting time has elapsed, the controller controls the second light source to be turned on, and controls the first light source and the second light source to be turned off when reaching maximum brightness.

5. The sequential lighting system according to claim 3, wherein, if the first light source is turned on and a setting time has elapsed, the controller allows the second light source to be turned on, allows the first light source to be maintained in a lighted state even if the first light source reaches maximum brightness, and turns off the first light source and the second light source at the same time when the first light source and the second light source reach the maximum brightness.

6. A control method of a sequential lighting system in which first and second light sources are respectively provided at one end and the other end of a light guide, the control method comprising:
a first light source control step of turning on the first light source; and
a second light source control step of turning on the second light source when a setting time has elapsed after the first light source is turned on, so as to increase brightness of the light guide while the light guide is crossed from the one end thereof to the other end thereof.

7. The control method according to claim 6, wherein:
the first light source control step includes turning off the first light source when the first light source reaches maximum brightness; and
the second light source control step includes turning off the second light source when the second light source reaches the maximum brightness after the first light source is turned off, so as to reduce brightness of the light guide while the light guide is crossed from the one end thereof to the other end thereof.

8. The control method according to claim 6, wherein:
the first light source control step includes maintaining a lighted state of the first light source even if the first light source reaches the maximum brightness and turning off the first light source when the second light source reaches the maximum brightness; and
the second light source control step includes turning off the second light source when the second light source reaches the maximum brightness.

* * * * *